(12) United States Patent
Bloom et al.

(10) Patent No.: US 8,717,499 B2
(45) Date of Patent: May 6, 2014

(54) AUDIO VIDEO OFFSET DETECTOR

(75) Inventors: Jeffrey A. Bloom, West Windsor, NJ (US); Dekun Zou, West Windsor, NJ (US); Ran Ding, Tinton Falls, NJ (US)

(73) Assignee: Dialogic Corporation, Montreal (CA)

( * ) Notice: Subject to any disclaimer, the term of this patent is extended or adjusted under 35 U.S.C. 154(b) by 370 days.

(21) Appl. No.: 13/224,744

(22) Filed: Sep. 2, 2011

(65) Prior Publication Data

US 2013/0057761 A1  Mar. 7, 2013

(51) Int. Cl.
*H04N 9/475* (2006.01)
*H04N 5/04* (2006.01)

(52) U.S. Cl.
USPC .......... 348/515; 348/512; 348/518; 348/500; 348/425.4; 348/180

(58) Field of Classification Search
USPC .............. 348/500.515, 512, 518, 425.4, 194, 348/180; 375/240.28, 354
See application file for complete search history.

(56) References Cited

U.S. PATENT DOCUMENTS

| | | | |
|---|---|---|---|
| 5,530,483 A | 6/1996 | Cooper et al. | |
| 5,751,368 A | 5/1998 | Cooper | |
| 6,330,033 B1 | 12/2001 | Cooper | |
| 6,351,281 B1 | 2/2002 | Cooper | |
| 6,836,295 B1 | 12/2004 | Cooper | |
| 7,710,499 B2 | 5/2010 | Cooper | |
| 8,159,610 B2 | 4/2012 | Cooper | |
| 8,531,603 B2 * | 9/2013 | Strein et al. | 348/512 |
| 2008/0062315 A1 * | 3/2008 | Oostveen et al. | 348/500 |
| 2012/0127365 A1 | 5/2012 | Cooper | |

OTHER PUBLICATIONS

J. Lu, "Video fingerprinting for copy identification: from research to industry applications," Proceedings of SPIE, Media Forensics and Security, vol. 7254, 2009.

R. Mohan, "Video sequence matching," Proceedings of International Conference on Acoustics, Speech and Signal Processing (ICASSP), vol. 6, pp. 3697-3700, 1998.

S. Lee, and C. D. Yoo, "Robust video fingerprinting for content-based video identification," IEEE Transactions on Circuits and Systems for Video Technology, vol. 18, No. 7, Jul. 2008.

X.-S. Hua, X. Chen and H.-J. Zhang, "Robust video signature based on ordinal measure," IEEE International Conference on Image Processing (ICIP), vol. 1, pp. 685-688, Oct. 2004.

(Continued)

*Primary Examiner* — Jefferey Harold
*Assistant Examiner* — Jean W Desir
(74) *Attorney, Agent, or Firm* — Chapin IP Law

(57) ABSTRACT

Systems and methods of measuring a temporal offset between audio content and video content that employ audio fingerprints from an audio signal in the audio content, and video fingerprints from video frames in the video content. The systems obtain reference audio and video fingerprints prior to transmission of video over a media channel, and obtain target audio and video fingerprints subsequent to transmission of the video over the media channel. Each fingerprint has an associated time stamp. Using the reference and target audio fingerprints and their associated time stamps, the systems determine an audio time stamp offset. Using the reference and target video fingerprints and their associated time stamps, the systems determine a video time stamp offset. Using the audio and video time stamp offsets, the systems determine a temporal offset between the video content and the audio content introduced by the media channel.

32 Claims, 7 Drawing Sheets

(56) References Cited

OTHER PUBLICATIONS

A. Joly, O. Buisson, and C. Frelicot, "Statistical similarity search applied to content-based video copy detection," Proceedings of the 1st International Workshop on Managing Data for Emerging Multimedia Applications, Tokyo, Japan, Apr. 2005.

N. Gengembre and S. Berrani, "A probabilistic framework for fusing frame-based searches within a video copy detection system," Proceedings of the International Conference on Content-based Image and Video Retrieval (CIVR), 2008.

A. J. Viterbi, "Error bounds for convolutional codes and an asymptotically optimum decoding algorithm," IEEE Transactions on Information Theory 13 (2): 260-269, 1967.

Z. Liu, T. Liu and B. Shahraray, "AT&T Research at TRECVID 2009 content-based copy detection," TRECVID Workshop, 2009.

A. Hampapur and R. M. Bolle, "Videogrep: Video copy detection using inverted file indices," Technical report, IBM research division, 2002.

M. Datar, N, Immorlica, P. Indyk, and V. Morrokni, "Locality-sensitive hashing scheme based on p-stable distributions," Proceedings of the ACM Symposium on Computational Geometry, 2004.

Mathieu Romano, Geoffroy Peeters, "Audio Identification Based on Spectral Modeling of Bark-Bands Energy and Synchronization Through Onset Detection," Ircam—CNRS (Sound Analysis/Synthesis Team), IEEE 2011.

Cooper, J. Carl, "Video-to-Audio Synchrony Monitoring and Correction", SMPTE Journal, Sep. 1988, total pp. 5, SMPTE, United States.

* cited by examiner

AUDIO VIDEO OFFSET DETECTOR

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present application relates generally to video transmission systems, and more specifically to systems and methods of measuring a temporal offset between video media content and audio media content introduced by a media channel.

BACKGROUND OF THE INVENTION

The term "video" is typically used to refer to a combination of video media content (e.g., a time sequence of images) and its associated audio media content. For example, such a combination of video media content and audio media content may be employed in television broadcasts and streaming video, among others. During the preparation and/or transmission of such video, the video media content and the audio media content may, at times, need to be separated to allow certain processing operations to be performed that are dependent on the nature of the respective media content. For example, in television broadcasts, such processing operations can include frame synchronization, digital video effects processing, video noise reduction, format conversion, MPEG pre-preprocessing, etc. Further, with regard to streaming video, such processing operations can include transforming the video media content and the audio media content to conform with/to one or more different protocol standards, changing the bandwidth used for the respective media content, etc. While such processing operations are being performed on the video media content and the audio media content, the video media content and the audio media content may pass through separate media channels and through different processing elements, which may subject the respective media content to different amounts of delay, resulting in a relative delay (such relative delay also referred to herein as a "temporal offset") between the video media content and the audio media content. For example, in a television broadcast of a talking person, a viewer of the television broadcast may perceive a temporal offset between the movement of the talking person's lips in a time sequence of images, and the sound generated from the associated audio media content.

The temporal relationship between video media content and its associated audio media content is referred to herein as the "A/V sync" or "lip sync". When not properly aligned, the video media content is said to contain A/V sync errors or lip sync errors. Although it can vary from person to person, it is generally known that a temporal offset would not be perceived by a human viewer if the audio media content leads the video media content by less than a threshold of about 0.015 seconds, or if the audio media content lags the video media content by less than a threshold of about 0.045 seconds. If such thresholds are exceeded, then it may be desirable to attempt to remove or reduce the temporal offset. One known technique for removing such a temporal offset is to apply some amount of delay to one of the audio media content and video media content components. Such a temporal offset can be a source of great discontent not only for viewers of an affected video, but also for those responsible for the creation and/or dissemination of the video, as they are often not immediately aware of the problem having occurred, and thus might not be in a good position to take steps to attempt to remedy the existing problem, and to try to prevent it from recurring in the future.

It would therefore be desirable to have improved systems and methods of measuring a temporal offset between video media content and audio media content introduced by a media channel that better address the issue of temporal offset.

BRIEF SUMMARY OF THE INVENTION

In accordance with the present application, systems and methods of measuring a temporal offset between video media content and associated audio media content introduced by a media channel are disclosed that employ one or more video fingerprints obtained from at least one video frame included in the video media content, and one or more audio fingerprints obtained from at least one audio signal included in the audio media content. The presently disclosed systems and methods can obtain such one or more video fingerprints and such one or more audio fingerprints prior to transmission of video over a media channel (such one or more video fingerprints and such one or more audio fingerprints obtained prior to the transmission of the video over the media channel also referred to herein as "reference video fingerprints" and "reference audio fingerprints," respectively), and subsequent to the transmission of the video over the media channel (such one or more video fingerprints and such one or more audio fingerprints obtained subsequent to the transmission of the video over the media channel also referred to herein as "target video fingerprints" and "target audio fingerprints," respectively). Each of the reference video fingerprints and the reference audio fingerprints has an associated time stamp prior to its transmission over the media channel, and each of the target video fingerprints and the target audio fingerprints has an associated time stamp subsequent to its transmission over the media channel. Using at least some of the reference video fingerprints and target video fingerprints along with their associated time stamps, the disclosed systems and methods can determine one or more video time stamp offsets. Further, using at least some of the reference audio fingerprints and target audio fingerprints along with their associated time stamps, the disclosed systems and methods can determine one or more audio time stamp offsets. Using at least some of the video time stamp offsets and audio time stamp offsets, the disclosed systems and methods can determine a temporal offset between the video media content and the audio media content introduced by the media channel..

In accordance with one aspect, an exemplary system for measuring a temporal offset between video media content and its associated audio media content introduced by a media channel (such exemplary system also referred to herein as a/the "A/V temporal offset measurement system") comprises a plurality of functional components, including a reference audio fingerprint extractor, a reference video fingerprint extractor, a target audio fingerprint extractor, a target video fingerprint extractor, an audio fingerprint matcher, a video fingerprint matcher, and an offset estimator. The reference audio fingerprint extractor is operative to receive at least one encoded bitstream from video prior to transmission of the video over a media channel (such video, prior to its transmission over the media channel, also referred to herein as a/the "reference content"), and to derive, extract, determine, or otherwise obtain characteristic reference audio fingerprint data corresponding to the reference audio fingerprints from at least one audio signal included in the reference content. The reference video fingerprint extractor is operative to receive the at least one encoded bitstream from the reference content, and to derive, extract, determine, or otherwise obtain characteristic reference video fingerprint data corresponding to the reference video fingerprints from at least one video frame included in the reference content. The target audio fingerprint extractor is operative to receive the video subsequent to its transmission over the media channel (such video subsequent to its transmission over the media channel also referred to herein as a/the "target content"), and to derive, extract, determine, or otherwise obtain characteristic target audio fingerprint data corresponding to the target audio fingerprints from the at least one audio signal included in the target content. The target video fingerprint extractor is operative to receive the target content, and to derive, extract, determine, or otherwise obtain characteristic target video fingerprint data corresponding to the target video fingerprints from the at least one video frame included in the target content. Such characteristic reference audio fingerprint data and such characteristic target audio fingerprint data can include, but are not limited to, a measure, a signature, and/or an identifier, for at least one predetermined time window of the audio signal. Further, such characteristic reference video fingerprint data and such characteristic target video fingerprint data can include, but are not limited to, a measure, a signature, and/or an identifier, for the at least one video frame.

The audio fingerprint matcher is operative to receive reference audio fingerprints from the reference audio fingerprint extractor, and to receive target audio fingerprints from the target audio fingerprint extractor. The audio fingerprint matcher is further operative to perform fingerprint matching of at least one of the target audio fingerprints against one or more of the reference audio fingerprints to obtain one or more reference audio fingerprints that match the target audio fingerprint (such reference audio fingerprints that match the target audio fingerprint also referred to herein as "reference audio fingerprint matches"). Using at least the time stamps associated with the target audio fingerprint and the reference audio fingerprint matches, the audio fingerprint matcher is further operative to compute, calculate, determine, or otherwise obtain one or more audio time stamp offsets. The video fingerprint matcher is operative to receive the reference video fingerprints from the reference video fingerprint extractor, and to receive the target video fingerprints from the target video fingerprint extractor. The video fingerprint matcher is further operative to perform fingerprint matching of at least one of the target video fingerprints against one or more of the reference video fingerprints to obtain one or more reference video fingerprints that match the target video fingerprint (such reference video fingerprints that match the target video fingerprint also referred to herein as "reference video fingerprint matches"). Using at least the time stamps associated with the target video fingerprint and the reference video fingerprint matches, the video fingerprint matcher is further operative to compute, calculate, determine, or otherwise obtain one or more video time stamp offsets. The offset estimator is operative to receive the audio time stamp offsets from the audio fingerprint matcher, and to receive the video time stamp offsets from the video fingerprint matcher. Using at least the audio time stamp offsets and the video time stamp offsets, the offset estimator is further operative to compute, calculate, determine, or otherwise obtain a value for the temporal offset between the video media content and the audio media content introduced by the media channel.

By extracting reference audio fingerprints and reference video fingerprints from video prior to transmission of the video over a media channel, extracting target audio fingerprints and target video fingerprints from the video subsequent to its transmission over the media channel, and using at least the reference audio fingerprints, the reference video fingerprints, the target audio fingerprints, and the target video fingerprints, along with their associated time stamps, to obtain a temporal offset value, the A/V temporal offset measurement system can provide information pertaining to the amount of temporal offset introduced by the media channel. The A/V temporal offset measurement system can also adjust the synchronization of the video content and the audio content based at least on the temporal offset between the video content and the audio content.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

Systems and methods of measuring a temporal offset between video media content and its associated audio media content introduced by a media channel are disclosed that employ one or more video fingerprints obtained from at least one video frame included in the video media content, and one or more audio fingerprints obtained from at least one audio signal included in the audio media content. The presently disclosed systems and methods can obtain such one or more video fingerprints and such one or more audio fingerprints prior to transmission of video over a media channel (such one or more video fingerprints and such one or more audio fingerprints obtained prior to the transmission of the video over the media channel also referred to herein as "reference video fingerprints" and "reference audio fingerprints," respectively), and subsequent to the transmission of the video over the media channel (such one or more video fingerprints and such one or more audio fingerprints obtained subsequent to the transmission of the video over the media channel also referred to herein as "target video fingerprints" and "target audio fingerprints," respectively). Each of the reference video fingerprints and the reference audio fingerprints has an associated time stamp prior to its transmission over the media channel, and each of the target video fingerprints and the target audio fingerprints has an associated time stamp subsequent to its transmission over the media channel. It is noted that video media content (e.g., a time sequence of images) and audio media content (e.g., at least one time-windowed audio signal) that have associated time stamps that are equivalent are generally intended to be presented to a viewer at substantially the same time. Using at least the reference video fingerprints and the target video fingerprints along with their associated time stamps, the disclosed systems and methods can determine one or more video time stamp offsets. Further, using at least the reference audio fingerprints and the target audio fingerprints along with their associated time stamps, the disclosed systems and methods can determine one or more audio time stamp offsets. Using at least the video time stamp offsets and the audio time stamp offsets, the disclosed systems and methods can determine a value of a temporal offset between the video media content and the audio media content introduced by the media channel (such a value for the temporal offset also referred to herein as a/the "temporal offset value").

Figure 1:
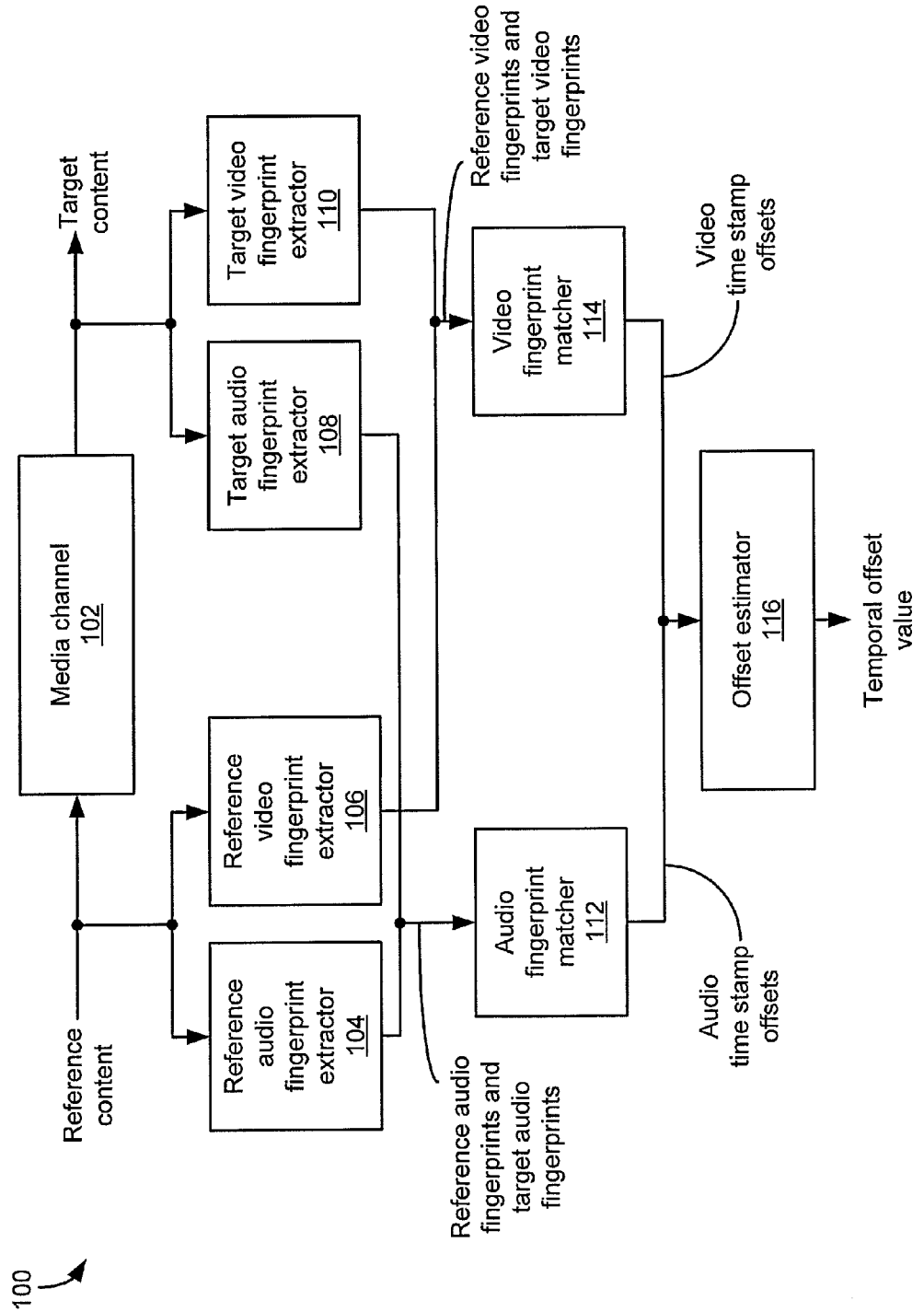
FIG. 1 is a block diagram of an exemplary system for measuring a temporal offset between video media content and audio media content introduced by a media channel, in accordance with an exemplary embodiment of the present application.

FIG. 1 depicts an illustrative embodiment of an exemplary system 100 for measuring a temporal offset between video media content and its associated audio media content introduced by a media channel (such exemplary system also referred to herein as a/the "A/V temporal offset measurement system"), in accordance with an exemplary embodiment of the present application. As shown in FIG. 1, the A/V temporal offset measurement system 100 comprises a plurality of functional components, including a reference audio fingerprint extractor 104, a reference video fingerprint extractor 106, a target audio fingerprint extractor 108, a target video fingerprint extractor 110, an audio fingerprint matcher 112, a video fingerprint matcher 114, and an offset estimator 116. The reference audio fingerprint extractor 104 is operative to receive at least one encoded bitstream from video prior to transmission of the video over a media channel 102 (such video, prior to its transmission over the media channel 102, also referred to herein as a/the "reference content"), and to derive, extract, determine, or otherwise obtain characteristic reference audio fingerprint data corresponding to the reference audio fingerprints from at least one audio signal included in the reference content. The reference video fingerprint extractor 106 is operative to receive the encoded bitstream from the reference content, and to derive, extract, determine, or otherwise obtain characteristic reference video fingerprint data corresponding to the reference video fingerprints from at least one video frame included in the reference content. The target audio fingerprint extractor 108 is operative to receive the video subsequent to its transmission over the media channel 102 (such video, subsequent to its transmission over the media channel 102, also referred to herein as a/the "target content"), and to derive, extract, determine, or otherwise obtain characteristic target audio fingerprint data corresponding to the target audio fingerprints from the audio signal included in the target content. The target video fingerprint extractor 110 is operative to receive the target content, and to derive, extract, determine, or otherwise obtain characteristic target video fingerprint data corresponding to the target video fingerprints from the video frame included in the target content. Such characteristic reference audio fingerprint data and such characteristic target audio fingerprint data can include, but is not limited to, a measure, a signature, and/or an identifier, for at least one predetermined time window of the audio signal. Further, such characteristic reference video fingerprint data and such characteristic target video fingerprint data can include, but is not limited to, a measure, a signature, and/or an identifier, for the video frame.

With further reference to FIG. 1, the audio fingerprint matcher 112 is operative to receive reference audio fingerprints from the reference audio fingerprint extractor 104, and to receive target audio fingerprints from the target audio fingerprint extractor 108. The audio fingerprint matcher 112 is further operative to perform fingerprint matching of at least one of the target audio fingerprints against one or more of the reference audio fingerprints to obtain one or more reference audio fingerprints that match the target audio fingerprint (such reference audio fingerprints that match the target audio fingerprint also referred to herein as "reference audio fingerprint matches"). It is noted that the target audio fingerprint corresponds to a time-windowed audio signal included in the target content, and one or more of the reference audio fingerprint matches can correspond to an equivalent time-windowed audio signal included in the reference content. Using at least the time stamps associated with the target audio fingerprint and the reference audio fingerprint matches, the audio fingerprint matcher 112 is further operative to compute, calculate, determine, or otherwise obtain one or more audio time stamp offsets. It is further noted that one or more of the audio time stamp offsets can correspond to a relative delay between a time-windowed audio signal included in the target content, and an equivalent time-windowed audio signal included in the reference content.

The video fingerprint matcher 114 is operative to receive the reference video fingerprints from the reference video fingerprint extractor 106, and to receive the target video fingerprints from the target video fingerprint extractor 110. The video fingerprint matcher 114 is further operative to perform fingerprint matching of at least one of the target video fingerprints against one or more of the reference video fingerprints to obtain one or more reference video fingerprints that match the target video fingerprint (such reference video fingerprints that match the target video fingerprint also referred to herein as a/the "reference video fingerprint matches"). It is noted that the target video fingerprint corresponds to a video frame included in the target content, and one or more of the reference video fingerprint matches can correspond to an equivalent video frame included in the reference content. Using at least the time stamps associated with the target video fingerprint and the reference video fingerprint matches, the video fingerprint matcher 114 is further operative to compute, calculate, determine, or otherwise obtain one or more video time stamp offsets. It is further noted that one or more of the video time stamp offsets can correspond to a temporal offset between a video frame included in the target content, and an equivalent video frame included in the reference content. The offset estimator 116 is operative to receive the audio time stamp offsets from the audio fingerprint matcher 112, and to receive the video time stamp offsets from the video fingerprint matcher 114. Using at least the audio time stamp offsets and the video time stamp offsets, the offset estimator 116 is further operative to compute, calculate, determine, or otherwise obtain a temporal offset value indicative of the temporal offset between the video media content and the audio media content introduced by the media channel 102.

The media channel 102 can include, by way of non-limiting example, a video encoder, an audio encoder, a video transcoder, an audio transcoder, a frame synchronizer, a digital video effects processor, a digital audio effects processor, a video noise reduction processor, an audio noise reduction processor, one or more format converters, an MPEG pre-preprocessor, a sampling rate converter, and/or any other suitable processing element(s), circuitry, and/or transmission channel(s) capable of introducing temporal delay between video media content and audio media content that is initially synchronized. When the video media content and the audio media content are transmitted over the media channel 102, the video media content and the audio media content may each pass through different processing elements and/or circuitry within the media channel 102, which may subject the respective media content to different amounts of delay, resulting in a temporal offset between the video media content and the audio media content at an output of the media channel 102. Further, many of the processing elements in the media channel 102 can assign new time stamps to their outputs, where the output time stamps are related to the input time stamps by an offset. In accordance with the illustrative embodiment of FIG. 1, it is assumed that the video media content and its associated audio media content are substantially in proper A/V sync or lip sync prior to their transmission over the media channel 102, but may or may not be in proper A/V sync or lip sync subsequent to their transmission over the media channel 102. Within the A/V temporal offset measurement system 100 of FIG. 1, the temporal offset value obtained by the offset estimator 116 can be used to correct the A/V sync error or lip sync error, or can be used to raise an alert indicating such A/V sync error or lip sync error.

An exemplary method 200 of operating an audio fingerprint extractor is described below with reference to FIG. 2. It is noted that each of the reference audio fingerprint extractor 104 and the target audio fingerprint extractor 108 included in the A/V temporal offset measurement system 100 (see FIG. 1) can be configured to operate in accordance with the exemplary method 200 shown in FIG. 2. As depicted in step 202 (see FIG. 2), at least one audio signal included in audio/video media content (e.g., the reference content and/or the target content) is sampled to obtain a sampled audio signal. As depicted in step 204 (see FIG. 2), a first short term Fourier transform (such first short term Fourier transform also referred to herein as a/the "1$^{st}$ STFT") is performed on the sampled audio signal. For example, the 1$^{st}$ STFT can be performed on the sampled audio signal using a Blackman window having a duration of about 100 milliseconds, and using a hop size of about 25 milliseconds. As depicted in step 206 (see FIG. 2), a second short term Fourier transform (such second short term Fourier transform also referred to herein as a/the "2$^{nd}$ STFT") is performed over the frequency response of the 1$^{st}$ STFT performed in step 204 (see FIG. 2). For example, the 2$^{nd}$ STFT can be performed over the frequency response of the STFT using a rectangular window having a duration of about 2 seconds, and using a hop size of about 50 milliseconds. As depicted in step 208 (see FIG. 2), adjacent frequencies from the frequency response of the 2$^{nd}$ STFT performed in step 206 (see FIG. 2) are merged to obtain a series of audio fingerprint vectors 210.1, 210.2, . . . , 210.p, in which each of the audio fingerprint vectors 210.1, 210.2, . . . , 210.p corresponds to a predetermined time window of the audio signal.

The exemplary method 200 of operating an audio fingerprint extractor is further described below with reference to the following exemplary analysis, as well as FIG. 2. Such an exemplary analysis is described in a publication of Mathieu Ramona and Geoffroy Peeters entitled "Audio Identification Based on Spectral Modeling of Bark-Bands Energy And Synchronisation Through Onset Detection," Proc. ICASSP, May 22-27, 2011, pages 477-480, which is incorporated herein by reference in its entirety. In accordance with step 202 (see FIG. 2), the audio signal from the audio/video media content (e.g., the reference content or the target content) is sampled to obtain the sampled audio signal (such sampled audio signal also denoted herein as "x(n)").

In accordance with step 204 (see FIG. 2), the 1$^{st}$ STFT is performed on the sampled audio signal, x(n), using the Blackman window (such Blackman window also denoted herein as "$w_1(n)$") having a duration of about 100 milliseconds, and using a hop size of about 25 milliseconds. For example, the Blackman window, $w_1(n)$, can be expressed as follows, $$w_1(n) = a_0 - a_1 \cos\left(\frac{2\pi n}{N_1 - 1}\right) + a_2 \cos\left(\frac{4\pi n}{N_1 - 1}\right), \quad (1)$$

in which $$a_0 = \frac{1-\alpha}{2}, \quad (2)$$

$$a_1 = \frac{1}{2}, \text{ and} \quad (3)$$

$$a_2 = \frac{\alpha}{2}, \quad (4)$$

and in which "N1" can be set to 4100 (reflecting 100 milliseconds at 41,000 samples per second) or any other suitable value, and "$\alpha$" can be set to 0.16 or any other suitable value. Specifically, the Blackman window, $w_1(n)$, can be applied to the sampled audio signal, x(n), to obtain a time-windowed, sampled audio signal, "$x_w(n,m)$," which can be expressed as follows, $$x_w(n,m)=x(m+n)w_s(n). \quad (5)$$

Further, the frequency response of the 1$^{st}$ STFT performed in step 204 (see FIG. 2) on the time-windowed, sampled audio signal, $x_w(n,m)$, at time "m" and frequency "k," can be expressed as follows, $$X_1(k, m) = \sum_{n=0}^{N_1-1} x_w(n, m) e^{-\frac{j2\pi kn}{N_1}}, \quad (6)$$

in which $$k=0, 1, \ldots, N_1, \text{ and} \quad (7)$$

$$m=0, 1, \ldots, M, \quad (8)$$

and in which the time "m" corresponds to the start of a short-term analysis window that has a length of $N_1$ samples, and "M" corresponds to the total number of time windows of the sampled audio signal, $x_w(n,m)$, in which each time window has a duration of about 100 milliseconds. It is noted that $X_1(k,m)$ can be expressed as a form of a complex number, a+jb, and therefore the magnitude of $X_1(k,m)$ can be obtained as follows, $$X_1(k,m)=a+j\cdot b, \quad (9)$$

$$X_{1_{(mag(k,m))}} = \sqrt{a^2+b^2}. \quad (10)$$

In accordance with step 206 (see FIG. 2), the 2$^{nd}$ STFT is performed over the frequency response of the 1$^{st}$ STFT performed in step 204 (see FIG. 2), using a rectangular window (such rectangular window also referred to herein as "$w_2(k)$") having a duration of about 2 seconds, and using a hop size of about 50 milliseconds. For example, the rectangular window, $w_2(k)$, can be expressed as follows, $$w_2(k)=1, \qquad (11)$$

in which $$k=0, 1, \ldots, N_2, \qquad (12)$$

and in which "$N_2$" can be set to 80 or any other suitable value. Specifically, the rectangular window, $w_2(k)$, can be applied to the frequency response of the $1^{st}$ STFT, $X_1(k,m)$, to obtain, for the $p^{th}$ window, $$X_1\text{-mag}_w(k, p, m) = X_1\text{-mag}(k, p+m)w_2(m). \qquad (13)$$

Further, the frequency response of the $2^{nd}$ STFT performed in step 206 (see FIG. 2) over the time, m, and for the frequency, k, can be expressed as follows, $$X_2(k, \kappa, p) = \sum_{m=0}^{N_2-1} X_{1_{mag_w}}(k, p, m)e^{-\frac{j2\pi\kappa k}{N_2}}, \qquad (14)$$

in which $$k=0,1,\ldots,N_1, \qquad (15)$$

$$\kappa=0,1,\ldots,N_2, \text{ and} \qquad (16)$$

$$p=1,2,\ldots,P, \qquad (17)$$

and in which "P" corresponds to the total number of time windows, each having a duration of about 2 seconds, used to perform the $2^{nd}$ STFT. It is noted that $X_2(k, \kappa, p)$ can be expressed as a form of a complex number, a+jb, and therefore the magnitude of $X_2(k, \kappa, p)$ can be obtained as follows, $$X_2(k, \kappa, p) = a + j \cdot b, \qquad (18)$$

$$X_{2_{mag(k,\kappa,p)}} = \sqrt{a^2+b^2}. \qquad (19)$$

Figure 2:
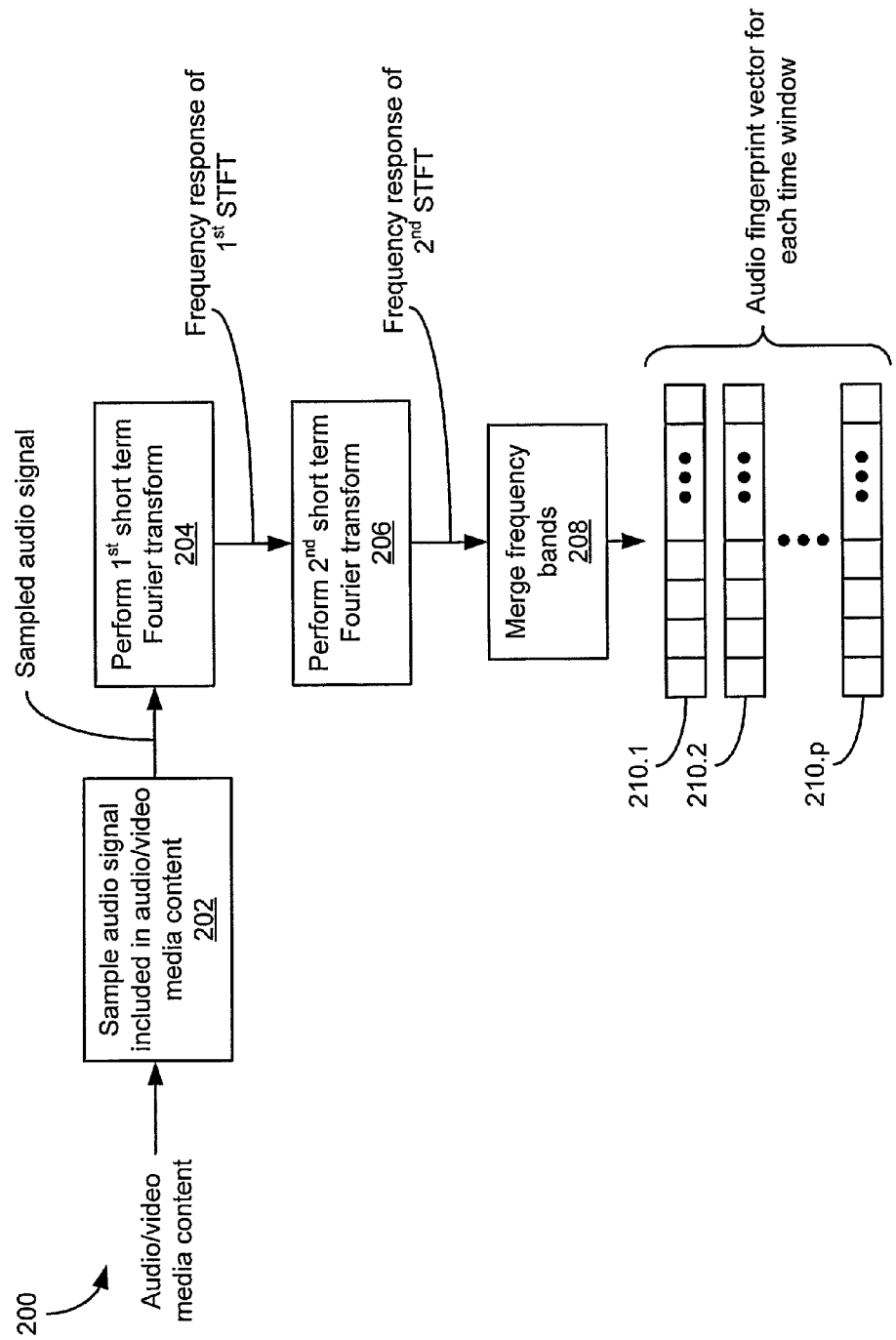
FIG. 2 is a flow diagram illustrating operation of an exemplary audio fingerprint extractor included in the exemplary system for measuring a temporal offset between video media content and audio media content of FIG. 1.

In accordance with step 208 (see FIG. 2), adjacent frequencies from the frequency response of the $2^{nd}$ STFT performed in step 206 (see FIG. 2) are merged to obtain the series of audio fingerprint vectors 210.1, 210.2, ..., 210.p (see FIG. 2). Specifically, a number of frequency bands (e.g., 6, or any other suitable number) are selected, and adjacent ones of the frequency bands are merged to obtain, for example, a 6×6 audio fingerprint vector, "vector$_{fp(i, j, p)}$," for each time window of the audio signal. Such an exemplary 6×6 audio fingerprint vector, vector$_{fp(i, j, p)}$, can be expressed as follows, $$\text{vector}_{fp(i,j,p)} = \sum_{k=freq_{edge_1}(i)}^{freq_{edge_1}(i+1)} \sum_{\kappa=freq_{edge_2}(j)}^{freq_{edge_2}(j+1)} X_{2_{mag(k,\kappa,p)}}, \qquad (20)$$

in which $$freq_{edge_1} = \{216, 259, 302, 345, 388, 431, 473\}, \text{ and} \qquad (21)$$

$$freq_{edge_2} = \{1, 8, 15, 22, 29, 36, 42\}. \qquad (22)$$

Figure 3:
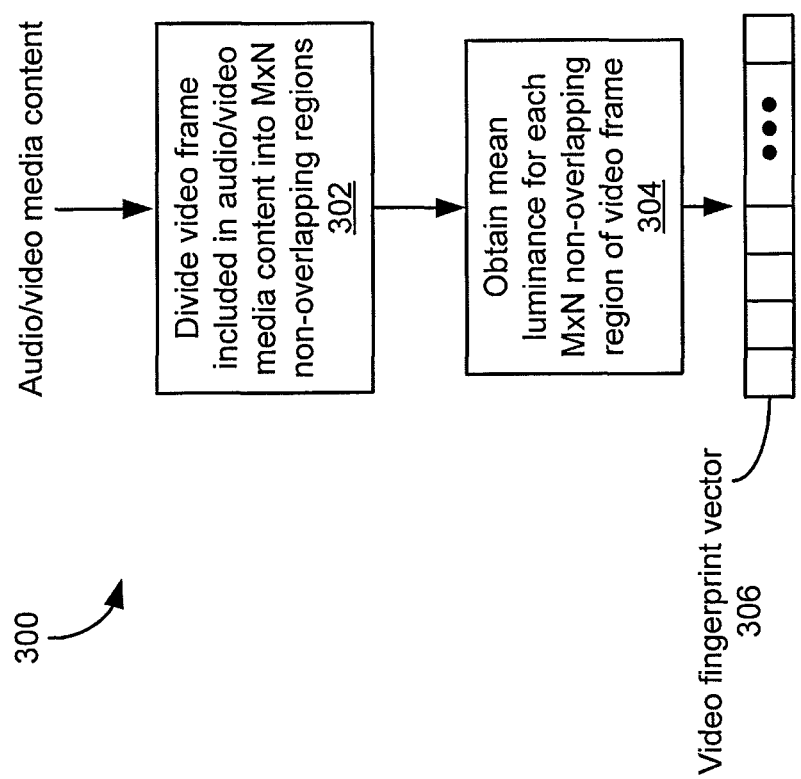
FIG. 3 is a flow diagram illustrating operation of an exemplary video fingerprint extractor included in the exemplary system for measuring a temporal offset between video media content and audio media content of FIG. 1.

An exemplary method 300 of operating a video fingerprint extractor is described below with reference to FIG. 3. It is noted that each of the reference video fingerprint extractor 106 and the target video fingerprint extractor 110 included in the A/N temporal offset measurement system 100 (see FIG. 1) can be configured to operate in accordance with the exemplary method 300 shown in FIG. 3. As depicted in step 302 (see FIG. 3), at least one video frame included in audio/video media content (e.g., the reference content and/or the target content) is divided into a plurality of M×N non-overlapping regions. As depicted in step 304 (see FIG. 3), the mean luminance for each of the M×N non-overlapping regions of the video frame is computed, calculated, determined, or otherwise obtained, thereby providing a video fingerprint vector 306 that corresponds to an M×N block mean luminance vector. For example, the mean luminance, "$L_k$," for each of the M×N non-overlapping regions of the video frame can be expressed as follows, $$L_k = \frac{1}{S}\sum_{i=1}^{S} p_i, \qquad (23)$$

in which "$p_i$" corresponds to the luminance value of a pixel, "i," within the M×N non-overlapping region, and "S" corresponds to the total number of pixels within the M×N non-overlapping region. Further, the mean luminance values for the respective M×N non-overlapping regions of the video frame can be used to form the video fingerprint vector 306, which can be expressed as $\{L_1, L_2, \ldots, L_K\}$ (e.g., K=M×N).

In accordance with one or more alternative embodiments, the reference video fingerprint extractor 106 (see FIG. 1) and the target video fingerprint extractor 110 (see FIG. 1) can be configured to derive, extract, determine, or otherwise obtain characteristic video fingerprint data that correspond to one or more video fingerprints from at least one video frame included audio/video media content (e.g., the reference content or the target content) by obtaining one or more ordinal measures of predetermined features of the audio/video media content, or by obtaining any other suitable measures, signatures, or identifiers.

Figure 4:
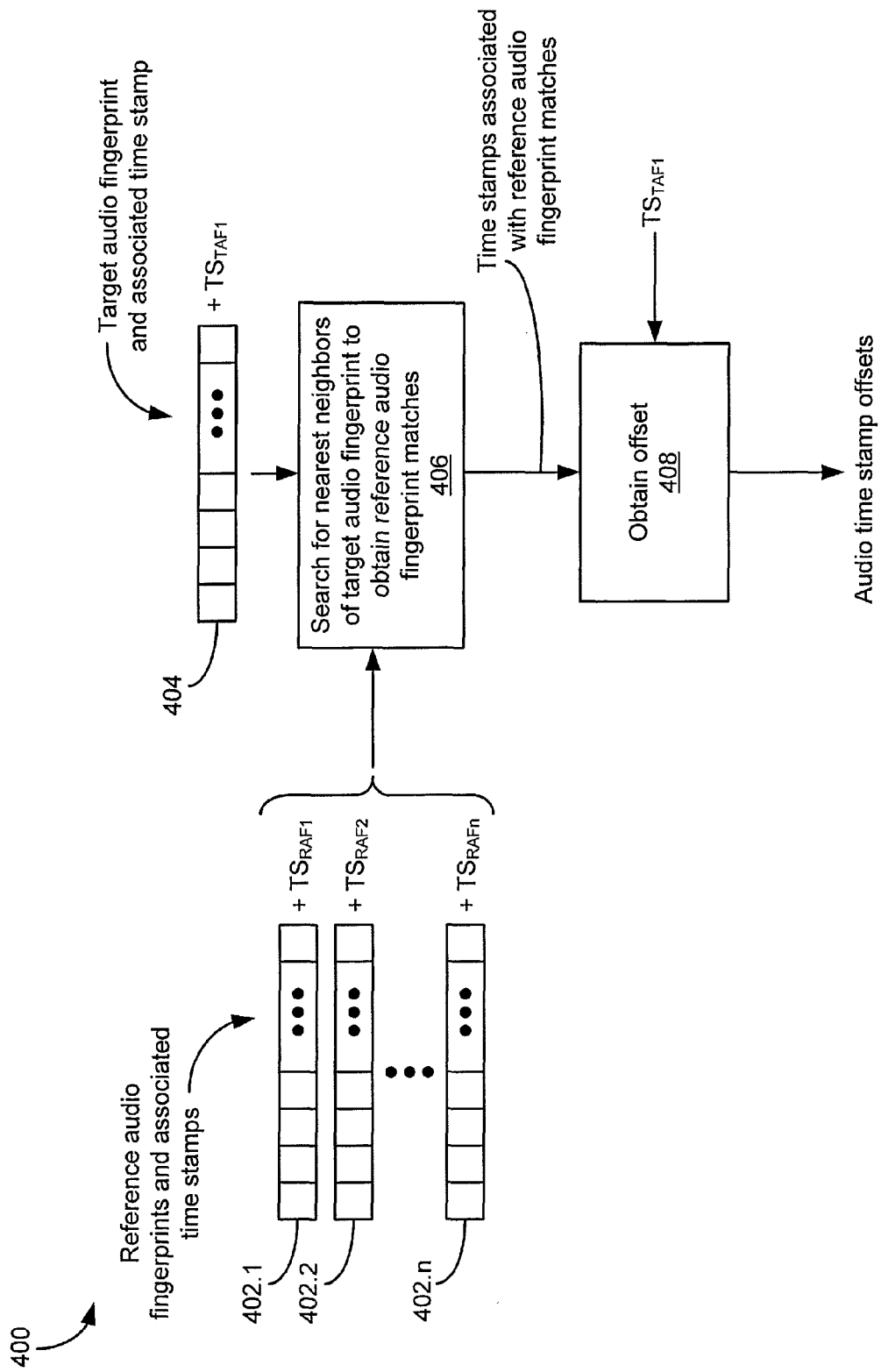
FIG. 4 is a flow diagram illustrating operation of an exemplary audio fingerprint matcher included in the exemplary system for measuring a temporal offset between video media content and audio media content of FIG. 1.

An exemplary method 400 of operating the audio fingerprint matcher 112 (see FIG. 1) is described below with reference to FIG. 4. In accordance with the exemplary method 400 shown in FIG. 4, the audio fingerprint matcher 112 is operative to perform fingerprint matching using a nearest neighbor search technique. As depicted in step 406 (see FIG. 4), one or more nearest neighbors of a target audio fingerprint vector 404 are searched for from among a series of reference audio fingerprint vectors 402.1, 402.2, ..., 402.n to obtain one or more reference audio fingerprint matches. As shown in FIG. 4, the target audio fingerprint vector 404 has an associated time stamp, $TS_{TAF1}$, and the reference audio fingerprint vectors 402.1, 402.2, ..., 402.n have associated time stamps, $TS_{RAF1}, TS_{RAF2}, \ldots, TS_{RAFn}$, respectively. For example, each of the associated time stamps, $TS_{TAF1}$ and $TS_{RAF1}, TS_{RAF2}, \ldots, TS_{RAFn}$, can indicate the start of a time window of the audio signal from which the associated audio fingerprint was obtained. As depicted in step 408 (see FIG. 4), using the time stamp(s) associated with the reference audio fingerprint match(es), and the time stamp, $TS_{TAF1}$, associated with the target audio fingerprint vector 404, one or more audio time stamp offsets are computed, calculated, determined, or otherwise obtained. For example, the nearest neighbor search technique performed in step 406 (see FIG. 4) can include computing, calculating, determining, or otherwise obtaining an Euclidean distance between the target audio fingerprint vector 404 and each of the reference audio fingerprint vectors 402.1, 402.2, ..., 402.n, and identifying the reference audio fingerprint that has the shortest Euclidean distance to the target audio fingerprint vector 404 to obtain the reference audio fingerprint match. Further, the offset determination performed in step 408 (see FIG. 4) can include obtaining an audio time stamp offset, "diffTS$_{audio}$," which can be expressed as $$\text{diff}TS_{audio} = TS_{TAF1} - TS_{RAFn}, \quad (24)$$

in which "TS$_{TAF1}$" corresponds to the time stamp associated with the target audio fingerprint vector 404, and "TS$_{RAFn}$" corresponds to the time stamp associated with, for example, the reference audio fingerprint vector 402.$n$.

Figure 5:
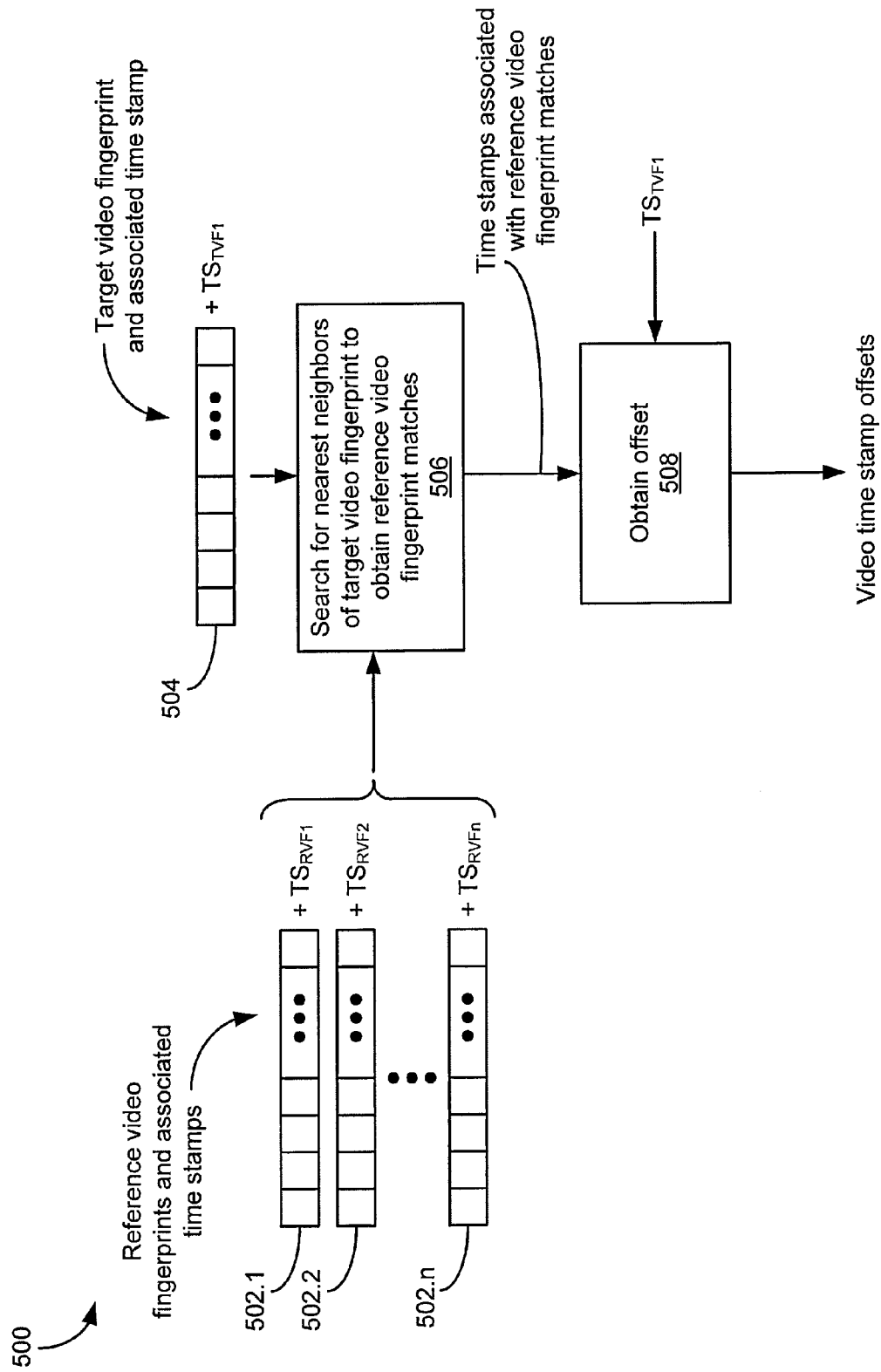
FIG. 5 is a flow diagram illustrating operation of an exemplary video fingerprint matcher included in the exemplary system for measuring a temporal offset between video media content and audio media content of FIG. 1.

An exemplary method 500 of operating the video fingerprint matcher 114 (see FIG. 1) is described below with reference to FIG. 5. Like the audio fingerprint matcher 112, the video fingerprint matcher 114 is operative to perform fingerprint matching using a nearest neighbor search technique. As depicted in step 506 (see FIG. 5), one or more nearest neighbors of a target video fingerprint vector 504 are searched for from among a series of reference video fingerprint vectors 502.1, 502.2, ..., 502.$n$ to obtain one or more reference video fingerprint matches. As shown in FIG. 5, the target video fingerprint vector 504 has an associated time stamp, TS$_{TVF1}$, and the reference video fingerprint vectors 502.1, 502.2, ..., 502.$n$ have associated time stamps, TS$_{RVF1}$, TS$_{RVF2}$, ..., TS$_{RVFn}$, respectively. For example, each of the time stamps, TS$_{TVF1}$ and TS$_{RVF1}$, TS$_{RVF2}$, ..., TS$_{RVFn}$, can indicate the display time of the video frame from which the associated video fingerprint was obtained. As depicted in step 508 (see FIG. 5), using the time stamp(s) associated with the reference video fingerprint match(es) and the time stamp, TS$_{TVF1}$, associated with the target video fingerprint vector 504, one or more video time stamp offsets are computed, calculated, determined, or otherwise obtained. For example, the nearest neighbor search technique performed in step 506 (see FIG. 5) can include computing, calculating, determining, or otherwise obtaining an Euclidean distance between the target video fingerprint vector 504 and each of the reference video fingerprint vectors 502.1, 502.2, ..., 502.$n$, and identifying the reference video fingerprint that has the shortest Euclidean distance to the target video fingerprint vector 504 to obtain the reference video fingerprint match. Further, the offset determination performed in step 508 (see FIG. 5) can include obtaining a video time stamp offset, "diffTS$_{audio}$," which can be expressed as $$\text{diff}TS_{video} = TS_{TVF1} - TS_{RVFn}, \quad (25)$$

in which "TS$_{TVF1}$" corresponds to the time stamp associated with the target video fingerprint vector 504, and "TS$_{RVFn}$" corresponds to the time stamp associated with, for example, the reference video fingerprint vector 502.$n$.

Figure 6:
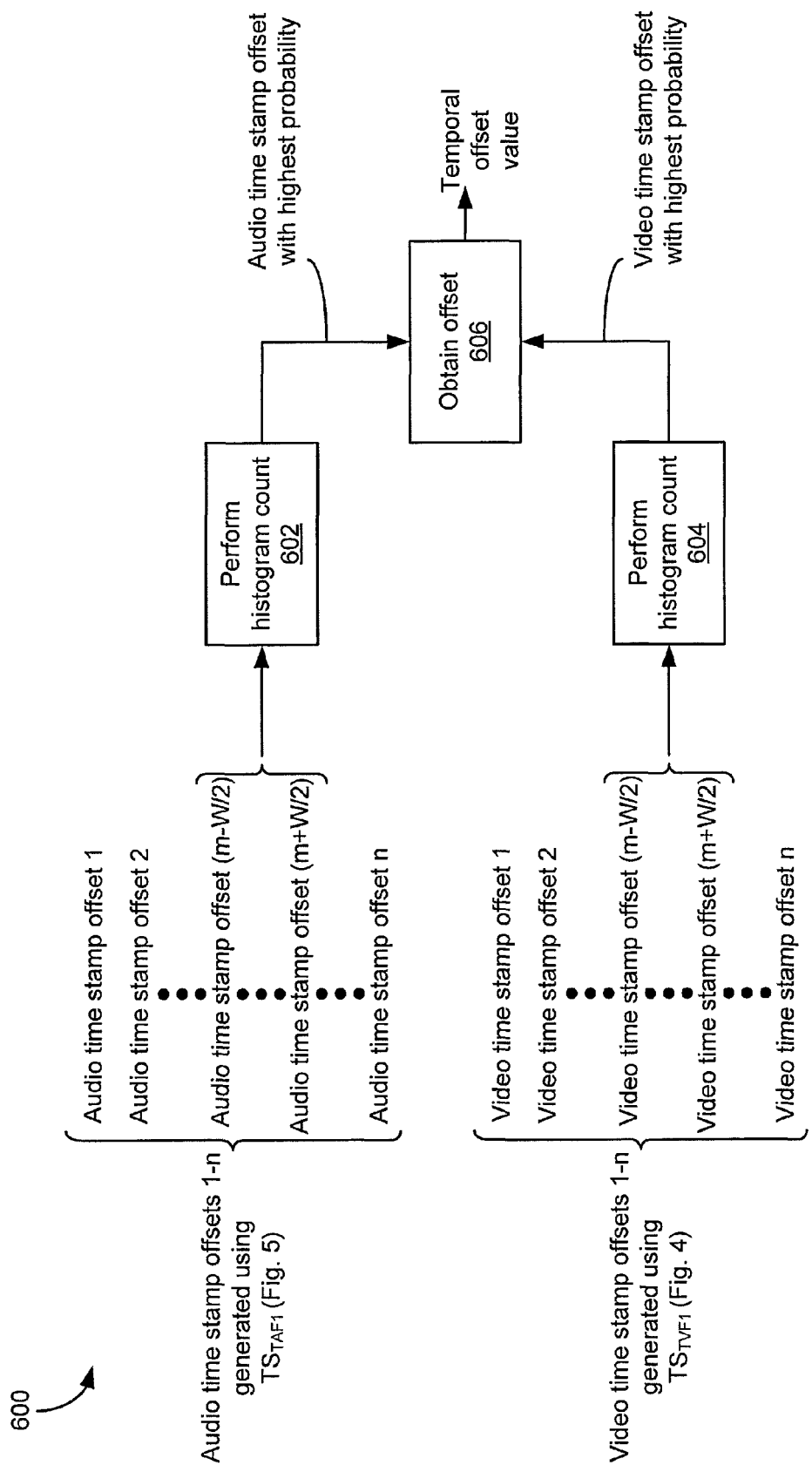
FIG. 6 is a flow diagram illustrating operation of an exemplary offset estimator included in the exemplary system for measuring a temporal offset between video media content and audio media content of FIG. 1.

An exemplary method 600 of operating the offset estimator 116 (see FIG. 1) is described below with reference to FIG. 6. In accordance with the exemplary method 600 of FIG. 6, the offset estimator 116 is operative to implement a time stamp offset smoothing technique, involving a moving window that has a size, "W," to account for any erroneous fingerprint matches that may have been obtained in the fingerprint matching performed by the audio fingerprint matcher 112 and/or the video fingerprint matcher 114. As depicted in step 602 (see FIG. 6), probabilities are determined, using a histogram count, for audio time stamp offsets, 1–n, which were obtained by the audio fingerprint matcher 112 using the time stamp, TS$_{TAF1}$, associated with the target audio fingerprint vector 404 (see FIG. 4). Specifically, the moving window having the size, W, is introduced along the time domain, and centered at time "t." Further, there are a total of W audio time stamp offsets within the window containing the audio time stamp offset (m−W/2) through the audio time stamp offset (m+W/2) (see FIG. 6). The histogram count is then performed by identifying the value of the audio time stamp offset that has the greatest number of occurrences within the window containing the audio time stamp offset (m−W/2) through the audio time stamp offset (m+W/2) (such audio time stamp offset that has the greatest number of occurrences within the window of size, W, at time, t, also referred to herein as a/the "audio time stamp offset with highest probability"). As depicted in step 604 (see FIG. 6), probabilities are determined, using a histogram count, for video time stamp offsets, 1–n, which were obtained by the video fingerprint matcher 114 using the time stamp, TS$_{TVF1}$, associated with the target video fingerprint vector 504 (see FIG. 5). Specifically, the moving window having the size, W, is introduced along the time domain, and centered at time, t. Further, there are a total of W video time stamp offsets within the window containing the video time stamp offset (m−W/2) through the video time stamp offset (m+W/2) (see FIG. 6). The histogram count is then performed by identifying the value of the video time stamp offset that has the greatest number of occurrences within the window containing the video time stamp offset (m−W/2) through the video time stamp offset (m+W/2) (such video time stamp offset that has the greatest number of occurrences within the window of size, W, at time, t, also referred to herein as a/the "video time stamp offset with highest probability"). As depicted in step 606, a temporal offset value is computed, calculated, determined, or otherwise obtained using the audio time stamp offset with highest probability and the video time stamp offset with highest probability. In one or more alternative embodiments, the difference between the video time stamp offset with highest probability and the audio time stamp offset with highest probability can be provided to obtain such a temporal offset value, "AVSync$_{offset}$," which can be expressed as follows, $$\text{AVSync}_{offset} = \text{diff}TS_{video} - \text{diff}TS_{audio}, \quad (26)$$

in which "diffTS$_{video}$" corresponds to the video time stamp offset with highest probability, and "diffTS$_{audio}$" corresponds to the audio time stamp offset with highest probability. As described above, such a temporal offset value can be applied to a video encoder, a video transcoder, and/or any other suitable processing element(s) and/or circuitry within the media channel 102 (see FIG. 1) to place video media content and audio media content transmitted over the media channel 102 in proper A/V sync or lip sync.

Figure 7:
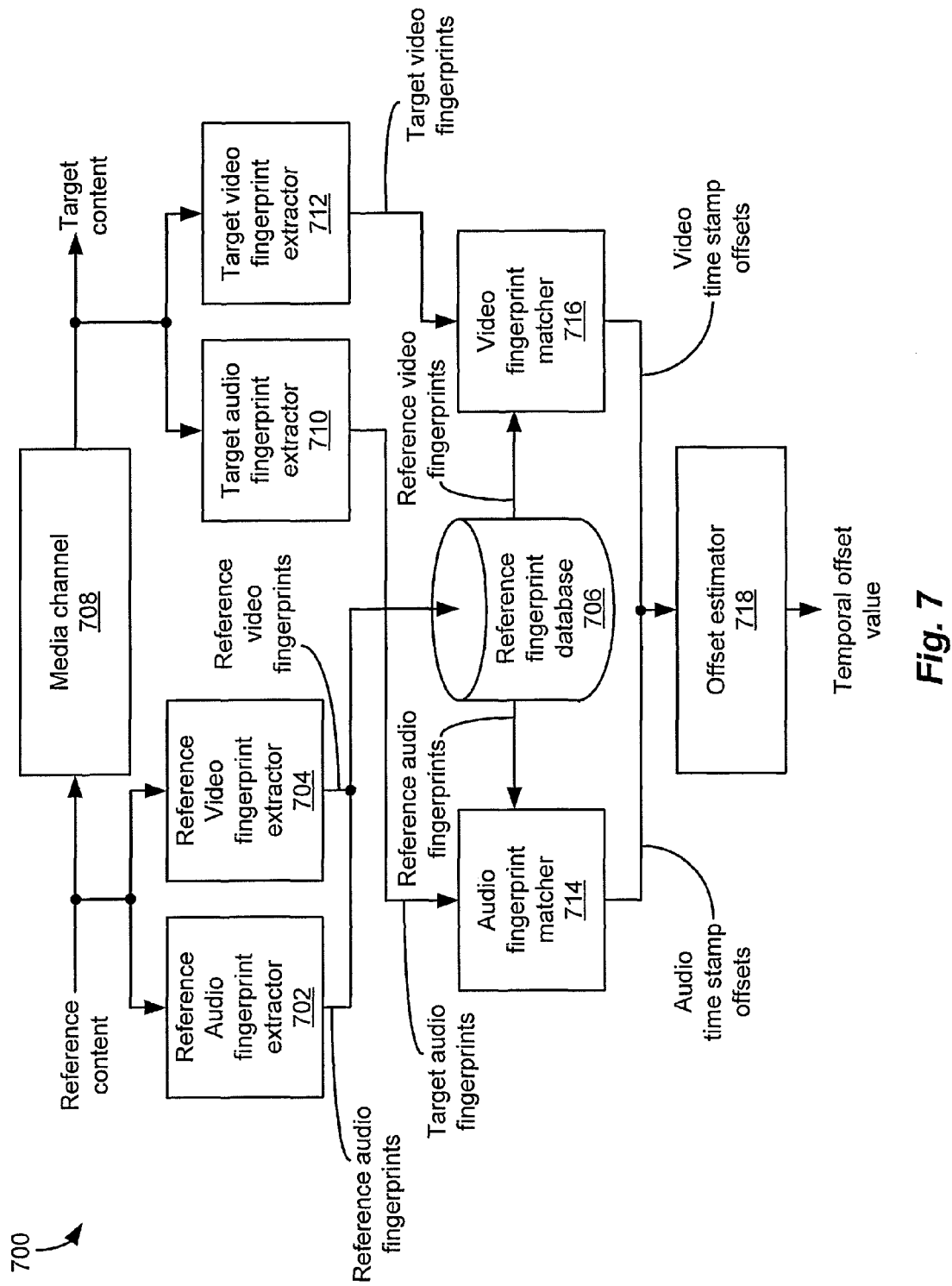
FIG. 7 is a block diagram of an exemplary alternative embodiment of the exemplary system for measuring a temporal offset between video media content and audio media content of FIG. 1.

Having described the above illustrative embodiments of the presently disclosed systems and methods of measuring a temporal offset between video media content and audio media content, further alternative embodiments and/or variations may be made/practiced. For example, FIG. 7 depicts an exemplary alternative embodiment 700 of the A/V temporal offset measurement system 100 (see FIG. 1). As shown in FIG. 7, the exemplary alternative A/V temporal offset measurement system 700 includes a plurality of functional components, such as a reference audio fingerprint extractor 702, a reference video fingerprint extractor 704, a target audio fingerprint extractor 710, a target video fingerprint extractor 712, an audio fingerprint matcher 714, a video fingerprint matcher 716, an offset estimator 718, and a reference fingerprint database 706. In the exemplary alternative embodiment 700, the reference audio fingerprint extractor 702 and the reference video fingerprint extractor 704 can be configured to operate along the lines of the reference audio fingerprint extractor 104 (see FIG. 1) and the reference video fingerprint extractor 106 (see FIG. 1), respectively. However, unlike the reference audio fingerprint extractor 104 (see FIG. 1) and the reference video fingerprint extractor 106 (see FIG. 1), the reference audio fingerprint extractor 702 and the reference video fingerprint extractor 704 are operative to provide reference audio fingerprints and reference video fingerprints, respectively, obtained from the reference content prior to its transmission over a media channel 708, along with their associated time stamps, to the reference fingerprint database 706. Further, the target audio fingerprint extractor 710 and the target video fingerprint extractor 712 can be configured to operate along the lines of the target audio fingerprint extractor 108 (see FIG. 1) and the target video fingerprint extractor 110 (see FIG. 1), respectively. Moreover, the audio fingerprint matcher 714, the video fingerprint matcher 716, and the offset estimator 718 can be configured to operate along the lines of the audio fingerprint matcher 112 (FIG. 1), the video fingerprint matcher 114 (FIG. 1), and the offset estimator 116 (FIG. 1), respectively. However, unlike the audio fingerprint matcher 112 (FIG. 1) and the video fingerprint matcher 114 (FIG. 1), the audio fingerprint matcher 714 and the video fingerprint matcher 716 are operative to receive the reference audio fingerprints and the reference video fingerprints, along with their associated time stamps, from the reference fingerprint database 706.

It is noted that the operations depicted and/or described herein are purely exemplary, and imply no particular order. Further, the operations can be used in any sequence, when appropriate, and/or can be partially used. With the above illustrative embodiments in mind, it should be understood that such illustrative embodiments can employ various computer-implemented operations involving data transferred or stored in computer systems. Such operations are those requiring physical manipulation of physical quantities. Typically, though not necessarily, such quantities take the form of electrical, magnetic, and/or optical signals capable of being stored, transferred, combined, compared, and/or otherwise manipulated.

Further, any of the operations depicted and/or described herein that form part of the illustrative embodiments are useful machine operations. The illustrative embodiments also relate to a device or an apparatus for performing such operations. The apparatus can be specially constructed for the required purpose, or can be a general-purpose computer selectively activated or configured by a computer program stored in the computer. In particular, various general-purpose machines employing one or more processors coupled to one or more computer readable media can be used with computer programs written in accordance with the teachings disclosed herein, or it may be more convenient to construct a more specialized apparatus to perform the required operations.

The presently disclosed systems and methods can also be embodied as computer readable code on a computer readable medium. The computer readable medium is any data storage device that can store data, which can thereafter be read by a computer system. Examples of such computer readable media include hard drives, read-only memory (ROM), random-access memory (RAM), CD-ROMs, CD-Rs, CD-RWs, magnetic tapes, and/or any other suitable optical or non-optical data storage devices. The computer readable media can also be distributed over a network-coupled computer system, so that the computer readable code can be stored and/or executed in a distributed fashion.

The foregoing description has been directed to particular illustrative embodiments of this disclosure. It will be apparent, however, that other variations and modifications may be made to the described embodiments, with the attainment of some or all of their associated advantages. Moreover, the procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A method of measuring a temporal offset between video content and audio content in a system for transmitting video, the video being subject to transmission over a media channel, the method comprising the steps of:

prior to transmission of the video over the media channel:
obtaining reference audio fingerprint data from the audio content and reference video fingerprint data from the video content, wherein each of the reference audio fingerprint data and the reference video fingerprint data includes associated time stamp data; and subsequent to the transmission of the video over the media channel:
obtaining target audio fingerprint data from the audio content and target video fingerprint data from the video content, wherein each of the target audio fingerprint data and the target video fingerprint data includes associated time stamp data; and
determining a temporal offset between the video content and the audio content based at least on the time stamp data associated with the reference video fingerprint data, the time stamp data associated with the target video fingerprint data, the time stamp data associated with the reference audio fingerprint data, and the time stamp data associated with the target audio fingerprint data.

2. The method of claim 1 wherein the video content and the audio content have an associated synchronization, and wherein the method further comprises:

subsequent to the transmission of the video over the media channel:
adjusting the synchronization of the video content and the audio content based at least on the temporal offset between the video content and the audio content.

3. The method of claim 1 wherein the obtaining of the reference audio fingerprint data comprises:
sampling at least one audio signal included in the audio content to obtain a sampled audio signal.

4. The method of claim 3 wherein the obtaining of the reference audio fingerprint data further comprises:
performing a first short term Fourier transform on the sampled audio signal.

5. The method of claim 4 wherein the obtaining of the reference audio fingerprint data further comprises:
performing a second short term Fourier transform over a frequency response of the first short term Fourier transform.

6. The method of claim 5 wherein the obtaining of the reference audio fingerprint data further comprises:
obtaining, via at least adjacent frequencies from the frequency response of the first short term Fourier transform and a frequency response of the second short term Fourier transform, a series of audio fingerprint vectors, wherein each of the audio fingerprint vectors corresponds to a predetermined time window of the audio signal.

7. The method of claim 1 wherein the obtaining of the target audio fingerprint data comprises:
  sampling at least one audio signal included in the audio content to obtain a sampled audio signal.

8. The method of claim 7 wherein the obtaining of the target audio fingerprint data further comprises:
  performing a first short term Fourier transform on the sampled audio signal.

9. The method of claim 8 wherein the obtaining of the target audio fingerprint data further comprises:
  performing a second short term Fourier transform over a frequency response of the first short term Fourier transform.

10. The method of claim 9 wherein the obtaining of the target audio fingerprint data further comprises:
  obtaining, via at least adjacent frequencies from the frequency response of the first short term Fourier transform and a frequency response of the second short term Fourier transform, a series of audio fingerprint vectors, wherein each of the audio fingerprint vectors corresponds to a predetermined time window of the audio signal.

11. The method of claim 1 wherein the obtaining of the reference video fingerprint data comprises:
  dividing at least one video frame included in the video content into a plurality of M×N non-overlapping regions.

12. The method of claim 11 wherein the obtaining of the reference video fingerprint data further comprises:
  obtaining a mean luminance for each of the M×N non-overlapping regions of the video frame to provide a video fingerprint vector that corresponds to an M×N block mean luminance vector.

13. The method of claim 1 wherein the obtaining of the target video fingerprint data comprises:
  dividing at least one video frame included in the video content into a plurality of M×N non-overlapping regions.

14. The method of claim 13 wherein the obtaining of the target video fingerprint data further comprises:
  obtaining a mean luminance for each of the M×N non-overlapping regions of the video frame to provide a video fingerprint vector that corresponds to an M×N block mean luminance vector.

15. The method of claim 1 wherein the reference audio fingerprint data includes one or more reference audio fingerprints that are characteristic of the audio content prior to the transmission of the video over the media channel, wherein the target audio fingerprint data includes at least one target audio fingerprint that is characteristic of the audio content subsequent to the transmission of the video over the media channel, and wherein the determining of the temporal offset between the video content and audio content comprises:
  performing fingerprint matching of the target audio fingerprint against one or more of the reference audio fingerprints to obtain one or more reference audio fingerprints that at least substantially match the target audio fingerprint.

16. The method of claim 15 wherein the performing of the fingerprint matching of the target audio fingerprint against one or more of the reference audio fingerprints comprises:
  searching for one or more nearest neighbors of the target audio fingerprint from among the reference audio fingerprints to obtain the one or more reference audio fingerprints that at least substantially match the target audio fingerprint.

17. The method of claim 16 wherein the searching for one or more nearest neighbors of the target audio fingerprint from among the reference audio fingerprints comprises:
  obtaining an Euclidean distance between the target audio fingerprint and each of the reference audio fingerprints.

18. The method of claim 17 wherein the searching for one or more nearest neighbors of the target audio fingerprint from among the reference audio fingerprints further comprises:
  identifying the reference audio fingerprint that has the shortest Euclidean distance to the target audio fingerprint.

19. The method of claim 15 wherein the determining of the temporal offset between the video content and audio content further comprises:
  through use of at least the time stamp data associated with the target audio fingerprint data and the time stamp data associated with the reference audio fingerprint data, obtaining one or more audio time stamp offsets indicative of one or more temporal offsets between the target audio fingerprint and one or more of the reference audio fingerprints that at least substantially match the target audio fingerprint.

20. The method of claim 19 wherein the reference video fingerprint data includes one or more reference video fingerprints that are characteristic of the video content prior to the transmission of the video over the media channel, wherein the target video fingerprint data includes at least one target video fingerprint that is characteristic of the video content subsequent to the transmission of the video over the media channel, and wherein the determining of the temporal offset between the video content and audio content further comprises:
  performing fingerprint matching of the target video fingerprint against one or more of the reference video fingerprints to obtain one or more reference video fingerprints that at least substantially match the target video fingerprint.

21. The method of claim 20 wherein the performing of the fingerprint matching of the target video fingerprint against one or more of the reference video fingerprints comprises:
  searching for one or more nearest neighbors of the target video fingerprint from among the reference video fingerprints to obtain one or more reference video fingerprints that at least substantially match the target video fingerprint.

22. The method of claim 21 wherein the searching for one or more nearest neighbors of the target video fingerprint from among the reference video fingerprints comprises:
  obtaining an Euclidean distance between the target video fingerprint and each of the reference video fingerprints.

23. The method of claim 22 wherein the searching for one or more nearest neighbors of the target video fingerprint from among the reference video fingerprints further comprises:
  identifying the reference video fingerprint that has the shortest Euclidean distance to the target video fingerprint.

24. The method of claim 20 wherein the determining of the temporal offset between the video content and audio content further comprises:
  through use of at least the time stamp data associated with the target video fingerprint data and the time stamp data associated with the reference video fingerprint data, obtaining one or more video time stamp offsets indicative of one or more temporal offsets between the target video fingerprint and one or more of the reference video fingerprints that at least substantially match the target video fingerprint.

25. The method of claim 24 wherein the determining of the temporal offset between the video content and audio content further comprises:

through use of at least (a) one or more of the audio time stamp offsets, and (b) one or more of the video time stamp offsets, obtaining a value indicative of the temporal offset between the video content and audio content.

26. The method of claim 25 wherein the obtaining of the value indicative of the temporal offset comprises:

through use of a histogram count, determining a number of occurrences within a predetermined moving window of each of the one or more audio time stamp offsets.

27. The method of claim 26 wherein the obtaining of the value indicative of the temporal offset further comprises:

identifying, from among the one or more audio time stamp offsets, the audio time stamp offset that has the greatest number of occurrences within the predetermined moving window.

28. The method of claim 27 wherein the obtaining of the value indicative of the temporal offset further comprises:

through use of a histogram count, determining a number of occurrences within the predetermined moving window of each of the one or more video time stamp offsets.

29. The method of claim 28 wherein the obtaining of the value indicative of the temporal offset further comprises:

identifying, from among the one or more video time stamp offsets, the video time stamp offset that has the greatest number of occurrences within the predetermined moving window.

30. The method of claim 29 wherein the obtaining of the value indicative of the temporal offset further comprises:

determining a difference between the video time stamp offset that has the greatest number of occurrences within the predetermined moving window and the audio time stamp offset that has the greatest number of occurrences within the predetermined moving window, such that the obtained value is indicative of the temporal offset between the video content and audio content.

31. A system for measuring a temporal offset between video content and audio content, the video content and the audio content being included in video that is subject to transmission over a media channel, the system comprising:

a reference audio fingerprint extractor operative, prior to the transmission of the video over the media channel, to obtain reference audio fingerprint data from the audio content;

a reference video fingerprint extractor operative, prior to the transmission of the video over the media channel, to obtain reference video fingerprint data from the video content, wherein each of the reference audio fingerprint data and the reference video fingerprint data includes associated time stamp data;

a target audio fingerprint extractor operative, subsequent to the transmission of the video over the media channel, to obtain target audio fingerprint data from the audio content;

a target video fingerprint extractor operative, subsequent to the transmission of the video over the media channel, to obtain target video fingerprint data from the video content, wherein each of the target audio fingerprint data and the target video fingerprint data includes associated time stamp data, wherein the reference audio fingerprint data includes one or more reference audio fingerprints characteristic of the audio content prior to the transmission of the video over the media channel, and wherein the target audio fingerprint data includes at least one target audio fingerprint characteristic of the audio content subsequent to the transmission of the video over the media channel;

an audio fingerprint matcher operative (a) to perform fingerprint matching of the target audio fingerprint against one or more of the reference audio fingerprints to obtain one or more reference audio fingerprints that at least substantially match the target audio fingerprint, and, (b) through use of at least the time stamp data associated with the target audio fingerprint data and the time stamp data associated with the reference audio fingerprint data, to obtain one or more audio time stamp offsets indicative of one or more temporal offsets between the target audio fingerprint and one or more of the reference audio fingerprints that at least substantially match the target audio fingerprint, wherein the reference video fingerprint data includes one or more reference video fingerprints characteristic of the video content prior to the transmission of the video over the media channel, and wherein the target video fingerprint data includes at least one target video fingerprint characteristic of the video content subsequent to the transmission of the video over the media channel;

a video fingerprint matcher operative (a) to perform fingerprint matching of the target video fingerprint against one or more of the reference video fingerprints to obtain one or more reference video fingerprints that at least substantially match the target video fingerprint, and, (b) through use of at least the time stamp data associated with the target video fingerprint data and the time stamp data associated with the reference video fingerprint data, to obtain one or more video time stamp offsets indicative of one or more temporal offsets between the target video fingerprint and one or more of the reference video fingerprints that at least substantially match the target video fingerprint; and an offset estimator operative, through use of at least (a) one or more of the audio time stamp offsets and (b) one or more of the video time stamp offsets, to obtain a value indicative of the temporal offset between the video content and audio content.

32. A system for measuring a temporal offset between video content and audio content, the video content and the audio content being included in video that is subject to transmission over a media channel, the system comprising:

a reference fingerprint database operative, prior to the transmission of the video over the media channel, to store reference audio fingerprint data from the audio content and reference video fingerprint data from the video content, wherein each of the reference audio fingerprint data and the reference video fingerprint data includes associated time stamp data;

a target audio fingerprint extractor operative, subsequent to the transmission of the video over the media channel, to obtain target audio fingerprint data from the audio content;

a target video fingerprint extractor operative, subsequent to the transmission of the video over the media channel, to obtain target video fingerprint data from the video content, wherein each of the target audio fingerprint data and the target video fingerprint data includes associated time stamp data, wherein the reference audio fingerprint data includes one or more reference audio fingerprints characteristic of the audio content prior to the transmission of the video over the media channel, and wherein the target audio fingerprint data includes at least one target audio fingerprint characteristic of the audio content subsequent to the transmission of the video over the media channel;

an audio fingerprint matcher operative (a) to perform fingerprint matching of the target audio fingerprint against one or more of the reference audio fingerprints to obtain one or more reference audio fingerprints that at least substantially match the target audio fingerprint, and, (b) through use of at least the time stamp data associated with the target audio fingerprint data and the time stamp data associated with the reference audio fingerprint data, to obtain one or more audio time stamp offsets indicative of one or more temporal offsets between the target audio fingerprint and one or more of the reference audio fingerprints that at least substantially match the target audio fingerprint, wherein the reference video fingerprint data includes one or more reference video fingerprints characteristic of the video content prior to the transmission of the video over the media channel, and wherein the target video fingerprint data includes at least one target video fingerprint characteristic of the video content subsequent to the transmission of the video over the media channel;

a video fingerprint matcher operative (a) to perform fingerprint matching of the target video fingerprint against one or more of the reference video fingerprints to obtain one or more reference video fingerprints that at least substantially match the target video fingerprint, and, (b) through use of at least the time stamp data associated with the target video fingerprint data and the time stamp data associated with the reference video fingerprint data, to obtain one or more video time stamp offsets indicative of one or more temporal offsets between the target video fingerprint and one or more of the reference video fingerprints that at least substantially match the target video fingerprint; and an offset estimator operative, through use of at least (a) one or more of the audio time stamp offsets and (b) one or more of the video time stamp offsets, to obtain a value indicative of the temporal offset between the video content and audio content.

* * * * *